H. E. HERBRANDSON.
TRIP MECHANISM FOR CORN PLANTERS.
APPLICATION FILED AUG. 12, 1909.

944,189.

Patented Dec. 21, 1909.

WITNESSES
L. H. Schmidt
C. E. Bauer

INVENTOR
HENRY E. HERBRANDSON,
BY Munn & Co
ATTORNEYS

UNITED STATES PATENT OFFICE.

HENRY E. HERBRANDSON, OF ALCESTER, SOUTH DAKOTA.

TRIP MECHANISM FOR CORN-PLANTERS.

944,189.    Specification of Letters Patent.    Patented Dec. 21, 1909.

Application filed August 12, 1909. Serial No. 512,594.

*To all whom it may concern:*

Be it known that I, HENRY E. HERBRANDSON, a citizen of the United States, and a resident of Alcester, in the county of Union and State of South Dakota, have made certain new and useful Improvements in Trip Mechanism for Corn-Planters, of which the following is a specification.

My invention is an improvement in trip mechanism for corn planters, and consists in certain novel constructions and combinations of parts, hereinafter described and claimed.

The object of the invention is to provide an improved trip mechanism, especially adapted for use with corn planters, but capable of use in any device where it is desirable to operate one part intermittently by means of a continuously moving part.

Figure 1:
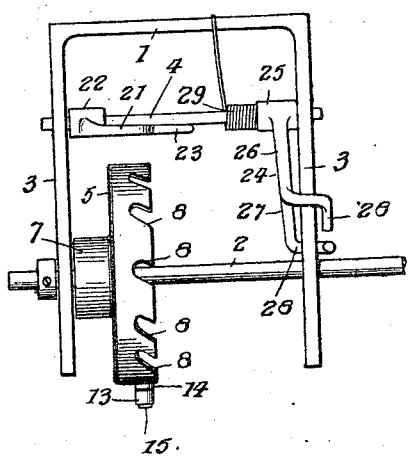
Figure 2:
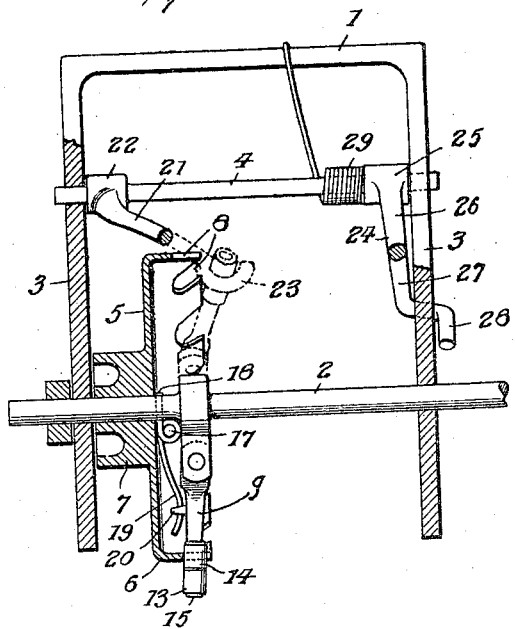
Figure 3:
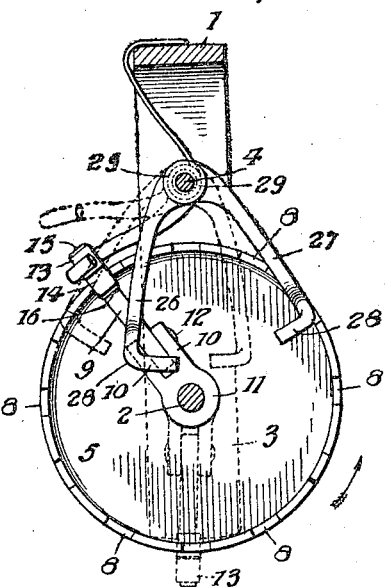
Figure 4:
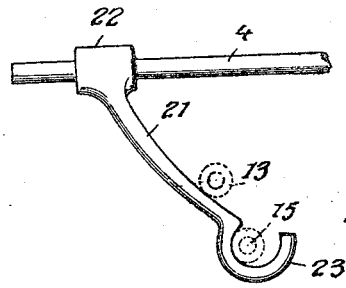

Referring to the drawings forming a part hereof, Figure 1 is a front view of the improvement, Fig. 2 is a similar view partly in section, Fig. 3 is a transverse section, and Fig. 4 is a detail view of the trip arm.

The embodiment of the invention shown in the drawings comprises a yoke 1, in whose arms 3 is journaled the shaft 2, which is the part to be intermittently driven. A rod 4 is also supported by the arms between the shaft 2 and the body portion of the yoke, the said rod being journaled in the arms.

A wheel comprising a disk 5 having an annular lateral flange 6 is journaled loosely on the shaft 2 by means of a hub 7 integral with the disk, and having an opening for receiving the shaft, and the flange 6 is provided with spaced notches 8, and all of the notches are inclined in the same direction, as will be evident from an inspection of Figs. 1 and 2.

The disk is the driving member of the mechanism, and the shaft is constrained to rotate therewith by means of a pawl arm 9, which is pivoted between spaced ears 10, on a collar 11 secured to the shaft, by means of a bolt or nut 12. The arm is also provided with a pair of rollers 13 and 14 journaled on the outer end thereof, between collars 15 and 16, the collar 15 being removable to permit the removal and replacement of the rollers.

The roller 14 is adapted to engage one of the notches 8 of the flange 6 and when the arm is so engaged the shaft is constrained to rotate with the disk, as long as the disk moves in the direction of the arrow in Fig. 3. Should the movement of the shaft be reversed the pawl arm is disengaged from the notches on account of their being inclined in the opposite direction.

The pawl arm is normally retained in engagement with the notches, by means of a spring comprising a coil 17 and two arms, the one arm 18 passing through an opening in the shaft 2, while the other 19 engages an eye 20 on the pawl arm.

The pawl arm is disengaged from the disk by a lever 21, provided with a hub portion 22 in which the rod 4 is secured, and the hub portion is arranged adjacent to one of the arms 3 of the yoke, and the arm inclines downwardly and inwardly, and is provided at its free end with a hook 23, which when the rod 4 is oscillated in one direction, is moved into the path of movement of the pawl arm. When so moved, the roller 13 engages the arm and rolls along the arm until it passes into the hook and is disengaged from the notch in which it rests, and the movement of the shaft ceases until the pawl arm is disengaged by the oscillation of the rod 4 in the opposite direction. The rod is oscillated by means of the usual forks of the planter or by means of a yoke shaped trip comprising a body portion 24, having a hub 25, in which is secured the rod, and two radial arms 26 and 27, each of which is provided at its extremity with an angular portion 28, which extends outside of the yoke frame, and is adapted for engagement by a suitable mechanism to operate the said trip.

The device is especially adapted for use in corn planters, with which it is desirable to be able to drill or to drop in hills at predetermined intervals. The planter in which the improvement is designed to be used, is that type known as the accumulation, in which the grain is fed continuously, but is permitted to accumulate in a receptacle or on a shelf, until a specified amount has thus accumulated, when it is pushed off or out and permitted to drop into the hill.

When operating as a drill, the arm 9 is engaged with the notches of the disk and retained in this position by shifting the lever 21 so that it will not strike the arm and when operating as a check rower it is permitted to engage and disengage with the disk at predetermined intervals, thus operating the pushing mechanism at the proper times to drop the accumulations of grain.

The operation of the device will be evident from the description.

A spring 29 is coiled around the rod 4, and one of the ends thereof engages the body of the yoke frame, while the other is secured to the trip, the spring acting to normally retain the lever in position for engaging the pawl arm, so that when the trip is not operated, the pawl arm is disengaged, that is the pawl arm is normally disengaged from the disk.

I claim—

1. A device of the character specified, comprising a yoke shaped frame, a shaft journaled in the arms thereof, a rod journaled parallel with the shaft, a disk journaled loosely on the shaft, and having an annular lateral flange provided with inclined notches, said notches being at spaced intervals and inclining in the same direction, a collar secured to the shaft and having spaced ears, a pawl arm pivoted between the ears, a spring normally retaining the arm in engagement with the notches, a lever secured to the rod, and inclining downwardly and inwardly and adapted for engagement by the pawl arm, when the rod is oscillated to swing the lever toward the shaft, said lever having at its extremity a hook for receiving the arm and retaining it out of engagement with the notches, a spring engaging the rod and normally retaining the lever in engaging position, and a trip for oscillating the rod.

2. A device of the character specified, comprising a shaft, a disk loosely journaled thereon and provided with an annular lateral flange having spaced inclined notches, a rod journaled parallel with the shaft, a pawl arm secured to the shaft, and mounted for swinging movement toward and from the disk, a spring normally retaining the arm in engagement with the notches, a lever secured to the rod, and inclining downwardly and inwardly and adapted for engagement by the pawl arm, when the rod is oscillated to swing the lever toward the shaft, said lever having at its extremity a hook for receiving the arm and retaining it out of engagement with the notches, a spring engaging the rod and normally retaining the lever in engaging position, and a trip on the rod for oscillating the same.

HENRY E. HERBRANDSON.

Witnesses:
 CHAS. J. PETERSON,
 CHAS. BUSHNELL.